United States Patent [19]

Vatel

[11] Patent Number: 5,361,489

[45] Date of Patent: Nov. 8, 1994

[54] METHODS OF STRIPPING INSULATION FROM WIRES

[76] Inventor: Bronislav Vatel, 3730 Countryside La., Glenview, Ill. 60025

[21] Appl. No.: 127,352

[22] Filed: Sep. 28, 1993

[51] Int. Cl.$^5$ .............................................. H01R 43/00
[52] U.S. Cl. ......................................... 29/825; 81/9.51
[58] Field of Search .................... 29/825, 564.4, 33 M; 81/9.51

[56] References Cited

U.S. PATENT DOCUMENTS

| | | |
|---|---|---|
| 880,790 | 3/1908 | Goehst . |
| 2,563,911 | 8/1951 | Beck . |
| 3,309,948 | 3/1967 | Falken . |
| 3,363,309 | 1/1968 | Logan et al. . |
| 3,645,156 | 2/1972 | Mayer et al. . |
| 3,895,426 | 7/1975 | Papsdorf ........................ 81/9.51 X |
| 4,060,891 | 12/1977 | Lerner . |
| 4,577,405 | 3/1986 | Butler . |
| 4,852,433 | 8/1989 | Butler ............................... 81/9.51 |
| 4,942,789 | 7/1990 | Hoffa et al. . |
| 4,972,582 | 11/1990 | Butler . |
| 4,979,299 | 12/1990 | Bieganski . |
| 4,985,996 | 1/1991 | Steiner . |
| 5,010,797 | 4/1991 | Stepan . |
| 5,016,347 | 5/1991 | Okazaki ............................. 29/825 |
| 5,025,687 | 6/1991 | Butler . |
| 5,142,950 | 9/1992 | Takano et al. .................. 29/825 X |
| 5,146,673 | 9/1992 | Hoffa ............................ 81/9.51 X |
| 5,253,555 | 10/1993 | Hoffa ................................ 81/9.51 |
| 5,269,206 | 12/1993 | Yagawa ............................ 81/9.51 |

Primary Examiner—Carl J. Arbes
Attorney, Agent, or Firm—H. Jay Spiegel

[57] ABSTRACT

The disclosed methods rely upon the use of unique sets of cutting blades. Each set of blades includes a V-blade and a Delta-blade. When the sets of blades are adjacent one another, a V-blade from one set of blades is adjacent the Delta-blade from the other set of blades and vice-versa. The angle of bevel of the respective pairs of blades is so oriented that when the sets of blades are adjacent one another, a sharp diamond-shaped opening is formed which automatically accommodates to the particular configuration of the wire which is to be stripped. In a modified embodiment, a cutter mechanism is employed along with a gripper mechanism thereby permitting the insulation with the conductor portion to be removed from the end of a wire with the remaining conductor portion being recessed within the end of the cut insulation.

12 Claims, 4 Drawing Sheets

METHODS OF STRIPPING INSULATION FROM WIRES

BACKGROUND OF THE INVENTION

The present invention relates to improved methods of stripping insulation from wires. In the prior art, apparatuses for stripping insulation from wires and methods of stripping are known. However, Applicant is unaware of any such apparatuses or methods including all of the features and aspects of the present invention.

The following prior art is known to Applicant:

U.S. Pat. No. 880,790 to Goehst discloses an implement for removing insulating covering from electric circuit wires which includes the combination of two sets of opposing back-to-back V-blades designed to cut insulation along with a flat blade which longitudinally shears a piece of insulation between the V-blades. The present invention differs from the teachings of Goehst as contemplating two sets of blades with each set including a V-blade and a Delta-blade, with the sets of blades being inverted with respect to one another.

U.S. Pat. No. 2,563,911 to Beck discloses a wire stripper having a gripper mechanism as well as a pair of cutting blades including U-shaped cutting surfaces. The present invention differs from the teachings of Beck as contemplating two sets of blades with each set including a V-blade and a Delta-blade and with the sets of blades being inverted with respect to one another.

U.S. Pat. No. 3,309,948 to Falken discloses a wire cutting and stripping apparatus which includes sets of V-blades installed back-to-back to guide and strip insulation while wire is held by grippers. The present invention differs from the teachings of Falken as contemplating two sets of blades with each set including a V-blade and a Delta-blade and with the respective sets of blades being inverted with respect to one another so that the V-blade from one set is adjacent the Delta-blade of the other set, and vice-versa.

U.S. Pat. No. 3,363,309 to Logan et al. discloses a method of attaching terminals to a length of insulated conductor including two sets of blades having U-shaped cutting regions which may move laterally with respect to one another to strip insulation from a conductor. The present invention differs from the teachings of Logan et al. as contemplating two sets of blades with each set including a V-blade and a Delta-blade and with the respective sets of blades being inverted with respect to one another so that the V-blade from one set is adjacent the Delta-blade of the other set, and vice-versa.

U.S. Pat. No. 3,645,156 to Myer et al. discloses an automatic wire nick detector for electric wire cut and strip machines, which device contemplates the use of pairs of opposed blades with one pair comprising a V-blade with a slot at the apex thereof combined with a blade with a U-shaped recess, and with a second pair of such blades being the same two blades but inverted in configuration. Additionally, a V-shaped wire cutting blade is also provided in a paired set. The present invention differs from the teachings of Myer et al. as contemplating two sets of blades with each set including a V-blade and a Delta-blade and with the respective sets of blades being inverted with respect to one another so that the V-blade from one set is adjacent the Delta-blade of the other set, and vice-versa. Additionally, in a further embodiment of the present invention, a gripper mechanism as well as a wire cutter may be employed.

U.S. Pat. No. 4,060,891 to Lerner discloses a wire stripper including an upper sharp edge guide designed to hold wire insulation and a V-blade designed to cut the insulation while the rest of the wire is pulled by hand in order to strip the insulation from the end of the wire. The present invention differs from the teachings of Lerner as contemplating two sets of blades with each set including a V-blade and a Delta-blade and with the respective sets of blades being inverted with respect to one another so that the V-blade from one set is adjacent the Delta-blade of the other set, and vice-versa.

U.S. Pat. No. 4,577,405 to Butler discloses a compound angle blade for stripping insulated electrical conductors. As shown in the Butler drawings, the blades comprise a pair of compound angle generally V-shaped blades operated in conjunction with one another to strip insulation. The present invention differs from the teachings of Butler as contemplating two sets of blades with each set including a V-blade and a Delta-blade and with the respective sets of blades being inverted with respect to one another so that the V-blade from one set is adjacent the Delta-blade of the other set, and vice-versa. The present invention is similarly distinguishable from U.S. Pat. Nos. 4,852,433, 4,972,582, and 5,025,687 to Butler.

U.S. Pat. Nos. 4,942,789 to Hoffa et al., 4,979,299 to Bieganski and 4,985,996 to Steiner disclose rotating blades which strip insulation all around the conductor. The present invention differs from the teachings of these patents as contemplating reciprocating sets of V-shaped and Delta-blades.

U.S. Pat. No. 5,010,797 to Stepan discloses the use of four sharp blades in a single plane to cut insulation while gripping means holds the wire. The present invention differs from the teachings of Stepan as contemplating two sets of blades with each set including a V-blade and a Delta-blade and with the respective sets of blades being inverted with respect to one another so that the V-blade from one set is adjacent the Delta-blade of the other set, and vice-versa.

As is known, the wire stripping industry utilizes two basic types of stripping blades for stripping insulation from the insulated electrical conductor. The first type is the "DIE" type blades which are designed to form only one specific hole size with no ability for adjustment. Two pairs of these blades working back-to-back may not require grippers because all four sharp edges are in the same plane. The second type which is commonly used in the prior art is the "V" type blades which can guide and tolerate a range of conductor sizes but which require grippers to hold the wire in place.

The present invention overcomes the disadvantages found in prior art stripper devices and methods by combining the advantages of "DIE" and V-type blades while eliminating the disadvantages which each type of blades possesses individually. In a similar way to the use of "DIE" type blades, no grippers are required in utilizing the present invention and method. On the other hand, since some of the blades are of the "V" type, they may tolerate a large number of different sizes of conductors and insulation thickness while allowing cutting and stripping of the insulation without damaging of the conductor. Since the force required to cut and strip the insulation is very low in light of the inventive design, the actual mounts and blades may even be made of plastic.

SUMMARY OF THE INVENTION

The present invention relates to improved methods of stripping insulation from wires. The inventive methods are practiced through the use of a uniquely designed apparatus as will be described in greater detail hereinafter. The inventive apparatus, in its various embodiments, which is utilized in practicing the methods of the present invention includes the following aspects and features:

(A) In a first aspect, the heart of the present invention comprises two sets or pairs of blades with each set or pair of blades consisting of one V-shaped blade and one Delta-blade movable toward and away from one another in a con, non plane by motive means. In a first set of such blades, the Delta-blade is the top blade whereas in the second set of blades, the V-shaped blade is the top blade. Thus, in a position where the sets of blades are adjacent to one another with adjacent side walls thereof engaging one another, a V-shaped blade of the first set of blades is immediately adjacent and in engagement with the Delta-blade of the other set of blades.

(B) The cutting edges of the respective blades are beveled from one side wall of each blade to the other respective side wall thereof. When the sets of blades are adjacent one another, the blades are, in essence, back-to-back in such a manner that the bevels converge toward one another to form a diamond-shaped opening through which the wire may protrude. When the blade pairs are reciprocated toward one another, this diamond-shaped opening reduces in size until the insulation of the wire is engaged and cut.

(C) Thereafter, one of the pairs of blades may be reciprocated in the closed position in the direction of the longitudinal axis of the wire to strip the insulation therefrom.

(D) Thereafter, with regard to each blade pair, the respective V and Delta-blades may be separated from one another allowing the wire with the insulation stripped off of the end thereof to be removed from the inventive device.

(E) In a further embodiment, a gripper and cutting blade may be provided to allow removal of insulation from an insulated conductor while the actual conductor is recessed within the cut end of the insulation. In this regard, the gripper is designed to move in the direction of the longitudinal axis of the wire in tandem with one of the sets of the blades. The wire cutter is associated with the other one of the sets of the blades so that the gripper may be utilized to securely grip the wire, whereupon the sets of blades may be reciprocated to cut the insulation, whereupon the set of blades associated with the gripper may be reciprocated longitudinally along the longitudinal axis of the wire along with the gripper to pull insulation with the wire while the insulation remaining on the wire is held by the set of blades associated with the cutter to expose additional wire. Thereafter, the cutter is employed to slice the wire at the location of the end of the insulation remaining on the wire so that when the blade pairs are moved to release the wire, the insulation springs back thereby recessing the end of the actual conductor within the end of the insulation.

(F) Based upon the above-described description of the apparatus which is utilized to practice the inventive method, the inventive method should be self-evident and will be explained in greater detail hereinafter.

Accordingly, it is a first object of the present invention to provide improved methods of stripping insulation from wires.

It is a further object of the present invention to provide such methods including the use of an apparatus employing two sets of blades with each such set employing the combination of a V-shaped blade and a Delta-blade.

It is a still further object of the present invention to provide such a device wherein each of the blades is beveled from one side wall to the other side wall.

It is a still further object of the present invention to provide such blade beveling such that when the blade pairs are adjacent one another, a diamond-shaped opening is formed with the wire to be stripped protruding therethrough, whereby when the blades of each pair of blades are reciprocated toward one another, the diamond-shaped opening is reduced in size until the insulation on the wire is cut.

It is a yet further object of the present invention to provide such a device with the combination of a gripping device and a wire cutter.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

The present invention mainly relates to improved methods of stripping insulation from wires. These improved methods are practiced utilizing the embodiments of apparatus disclosed herein.

With reference, first, to FIGS. 1-8, a first embodiment of apparatus utilized in practicing the inventive methods will now be described.

Figure 1:
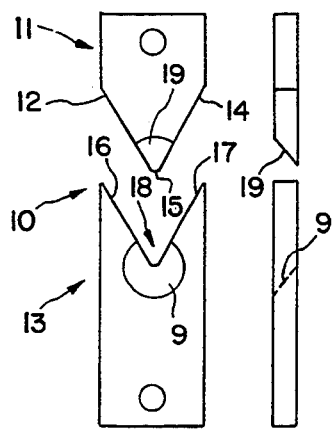
FIG. 1 shows front and side views, respectively, of one set of Delta and V-shaped blades.

With reference, first, to FIG. 1, a pair of blades is generally designated by the reference numeral 10 and is seen to include a Delta-blade 11 and a V-shaped blade 13. The Delta-blade 11 includes edges 12 and 14 which converge at an arcuate cutting edge 15. The V-shaped blade 13 includes edges 16 and 17 which converge at a cutting region 18 having an arcuate shape. As particularly shown in the side views of FIG. 1, the region adjacent the cutting edge 15 of the blade 11 is beveled at 19 while the cutting edge of the blade 13 is beveled at 9.

Figure 2:
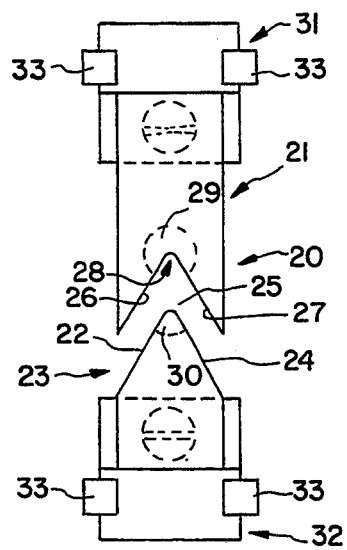
FIG. 2 shows a front view of a second set of Delta and V-shaped blades showing them mounted on support blocks.

A second set of blades 20 is illustrated in FIG. 2 and includes a V-shaped blade 21 and a Delta-blade 23. In correspondence to FIG. 1, the Delta-blade 23 includes edges 22 and 24 which converge at an arcuate cutting edge 25. The V-shaped blade 21 includes edges 26 and 27 which converge at a cutting region 28 having an arcuate shape. Corresponding to FIG. 1, the cutting region 28 is beveled at 29 whereas the cutting edge 25 is beveled at the area 30.

As also shown in FIG. 2, the V-shaped blade 21 is mounted on a mount 31 whereas the Delta-blade 23 is mounted on a mount 32. The mounts 31 and 32 include guide rails 33 which permit both reciprocation of the blades 21 and 23 with respect to one another as well as sliding movement of the blades 21 and 23 in tandem along the longitudinal axis of a wire extending between the blades 21 and 23 toward and away from the set of blades 10, as will be described in greater detail hereinafter.

Figure 3:
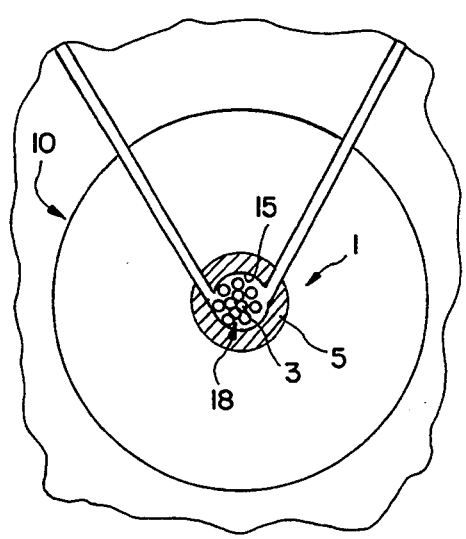
FIG. 3 shows an enlarged view of the interface between respective V-shaped and Delta-blades with an electrical wire caught therebetween.

With reference to FIG. 3, a close-up view of the blade set 10 shows the relationship between the cutting regions 15 and 18 with a wire 1 having an electrical conductor 3 and an insulative covering 5 caught therebetween.

With reference, now, to FIGS. 4-8, a method of stripping wires will now be described.

Figure 4:
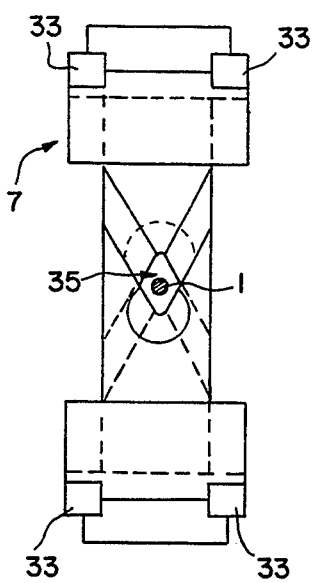
FIG. 4 shows a front view of the diamond-shaped opening formed between adjacent sets of blades with an electrical wire within the diamond-shaped opening.
Figure 5:
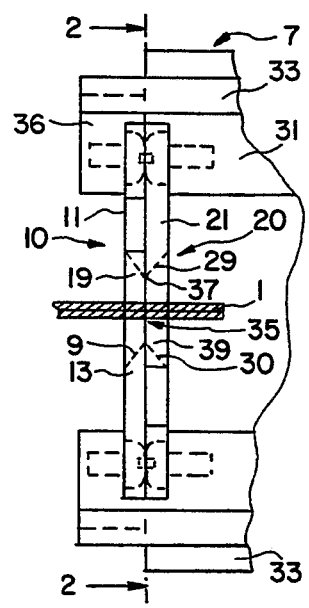
FIG. 5 shows a side view of the configuration of FIG. 4.

With particular reference, first, to FIGS. 4 and 5, it is seen that the set of blades 10 and the set of blades 20 are so installed in the stripper mechanism that the directions of the respective bevels of the blades illustrated, in particular, in FIG. 5 by the reference numerals 19, 9, 29, 30, combine together to form a diamond-shaped opening 35 through which the wire 1 is inserted. As shown in FIG. 5, the points of intersection of the beveled edges 19, 29 and 9, 30, respectively, form a pointed interface designated by the respective reference numerals 37 and 39 in FIG. 5. When the blades of the blade pairs 10 and 20 are reciprocated toward one another as will be described in greater detail with reference to FIG. 6, the points of intersection 37, 39 engage the wire 1 to cut the insulative covering 5 thereof.

With further reference to FIGS. 4 and 5, the guide rails 33 are particularly shown as are the mounts 31 and 32 for the set of blades 20 and 36 for the set of blades 10. As should be understood from FIGS. 4 and 5, the mounts 36 are fixedly mounted to the guide rails 33 whereas the mounts 31 and 32 for the set of blades 20 may reciprocate with respect to the rails 33 to allow movement of the set of blades 20 with respect to the set of blades 10 in the direction of the longitudinal axis of the wire 1 in the view of FIG. 5.

Figure 6:
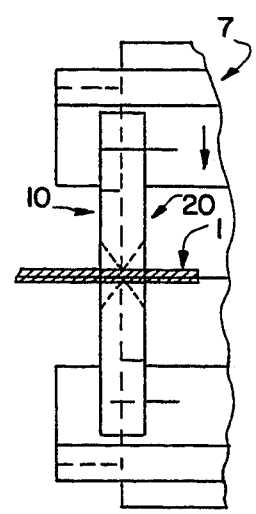
FIG. 6 shows a view similar to that of FIG. 5 but with the blades reciprocated together to cut the insulation from the wire.
Figure 7:
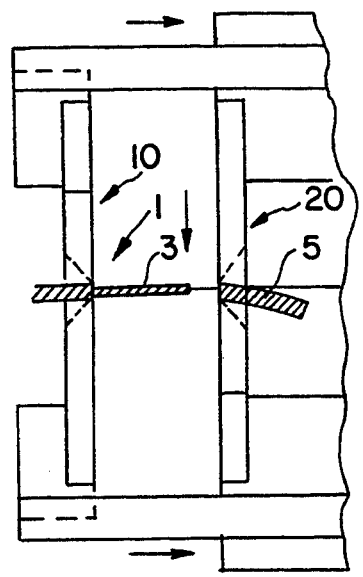
FIG. 7 shows a view from the same direction as FIGS. 5 and 6 but with one of the sets of blades reciprocated in the direction of the longitudinal axis of the electrical wire to strip insulation therefrom.
Figure 8:
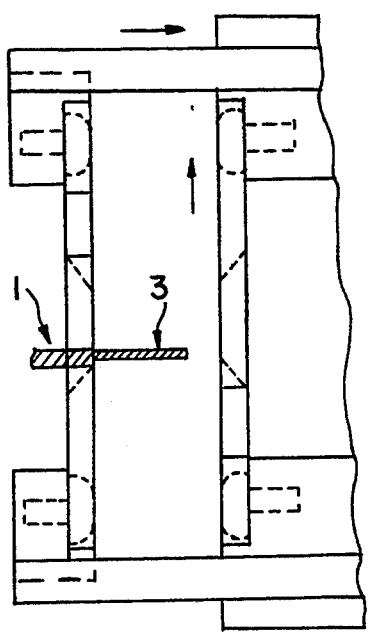
FIG. 8 is a view similar to FIG. 7 but with the respective blades in each set separated from one another to allow removal of the stripped wire.

As shown in FIG. 6, when the blades 11 and 13 are reciprocated toward one another while the blades 21 and 23 are simultaneously reciprocated toward one another, the inventive wire stripping device 7 adopts the position shown in FIG. 6 with the points of intersection 37 and 39 and adjacent peripheral cutting edges piercing the insulative covering of the wire 1 to cut the insulation thereof as also explained with reference to FIG. 3. Thereafter, the set of blades 20 is reciprocated along the longitudinal axis of the wire 1 to strip the insulative covering 5 therefrom as best seen in FIG. 7. Thereafter, with reference to FIG. 8, the blade pairs 11, 13 and 21, 23 may be separated with respect to one another to allow removal of the stripped wire 1 with the bare conductor 3 showing.

Of course, in operating the apparatus 7 to perform the inventive method, various hydraulic or pneumatic rams may be employed. Thus, for example, hydraulic or pneumatic rams may be employed to allow movement of the blades 11 and 13 toward and away from one another in cutting and releasing motions. Similarly, hydraulic or pneumatic rams may be employed to allow movement of the blades 21 and 23 toward and away from one another. Additionally, an additional hydraulic or pneumatic ram may be employed to allow reciprocation of the set of blades 20 with respect to the set of blades 10 along the longitudinal axis of the wire 1 as illustrated in FIG. 7 as compared to FIG. 6. These hydraulic or pneumatic rams are conventional and do not form a part of the present invention except in the combination of elements including the particular blade configurations disclosed herein.

With reference, now, to FIGS. 9-14, a second embodiment of the present invention will now be described. In the description of FIGS. 9-14, like elements corresponding to the elements illustrated in FIGS. 1-8 will be identified using like primed reference numerals.

Figure 9:
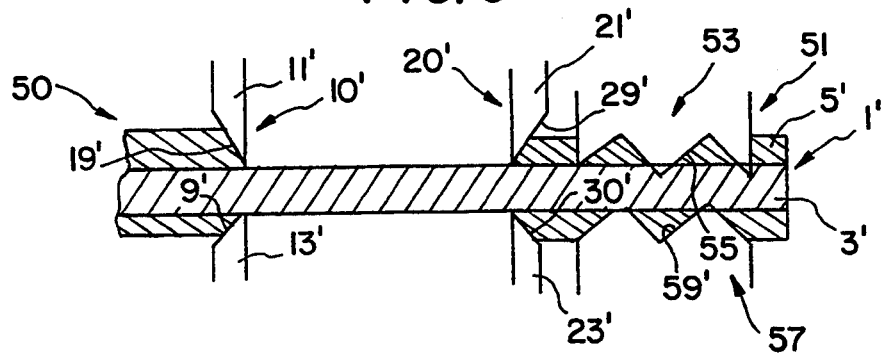
FIG. 9 shows a side view of a second embodiment of the present invention employing a gripper mechanism.

With reference, first, to FIG. 9, a device 50 is seen to include a set of blades 10' and a set of blades 20'. The set of blades 10' includes the blades 11' and 13' with the blade 11' comprising a Delta-blade and with the blade 13' comprising a V-shaped blade. The set of blades 20' includes the V-shaped blade 21' and the Delta-blade 23'. As shown in FIG. 9, the blade 11' includes a beveled cutting edge 19' while the blade 13' includes a beveled cutting edge 9'. The blade 21' includes a beveled cutting edge 29' while the blade 23' includes a beveled cutting edge 30'.

The inventive device illustrated in FIGS. 9-14 includes a gripper means 51 including an upper gripper 53 having a gripping face 55 and a lower gripper 57 having a gripping face 59. The set of grippers 51 is specifically designed to grip the insulative covering 5' of the electrical wire 1' and, as particularly shown in FIG. 9, to also grip the electrical conductor 3' within the insulative covering 5' to prevent relative movement between the electrical conductor 3' and the insulative covering 5', for a purpose to be described in greater detail hereinafter.

Figure 10:
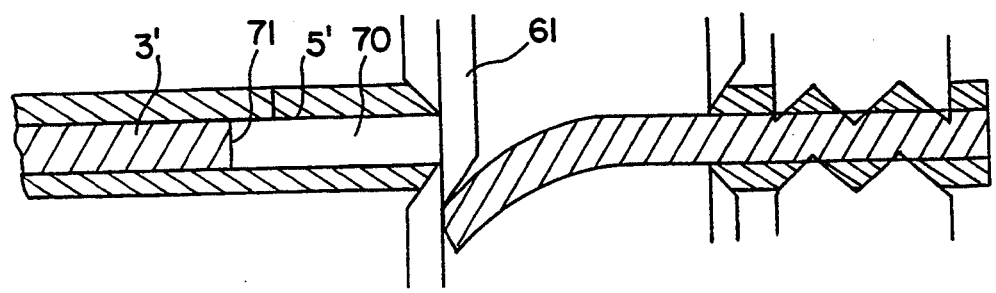
FIG. 10 shows further details of the embodiment illustrated in FIG. 9 showing the further provision of a wire cutter.
Figure 13:
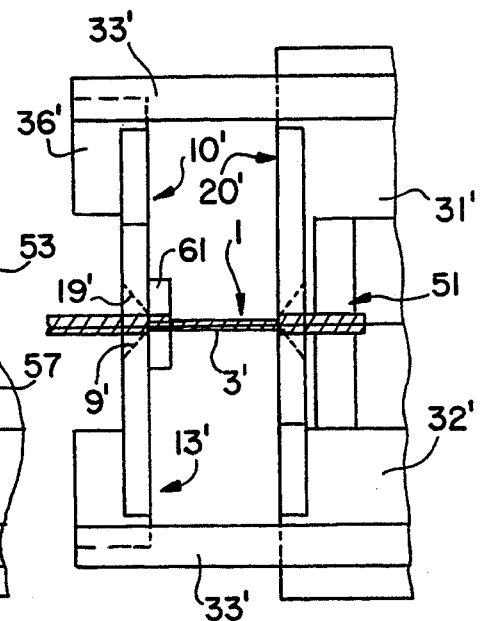
FIG. 13 shows the set of blades associated with the gripper and the gripper reciprocated in the direction of the longitudinal axis of the wire to simultaneously pull the insulation with the conductor from the end of the wire and pull back the remaining insulation from the remaining wire.
Figure 14:
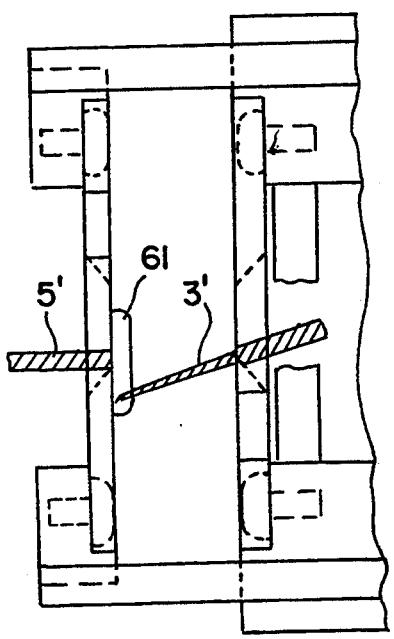
FIG. 14 shows the wire cutter reciprocated to a position cutting the end of the wire therefrom.

With further reference to FIGS. 10, 13 and 14, a wire cutter 61 is mounted in the inventive device 50 immediately adjacent the downstream faces of the blades 11' and 13'. The wire cutter 61 moves under control of suitable motive means in the same plane in which reciprocation of the blades 11' and 13' toward and away from one another occurs. As shown in FIG. 14, when reciprocated, the wire cutter 61 may slice the electrical conductor 3' using the downstream edges of the blades 11' and 13' as a cutting guide. As should also be understood from viewing of FIGS. 9, 10, 13 and 14, in particular, the wire cutter 61 is carried on the same structure as is the blade 13' so that the wire cutter 61 is always in engagement with the downstream faces of the blades 11' and 13'. Similarly, with reference to the same figures, it should be understood that the set of grippers 51 is carried on the same structure which carries the set of blades 20' and is constrained to move therewith when the set of blades 20' moves along the longitudinal axis of the electrical conductor 3'.

As best seen with reference to FIGS. 11-14, the set of blades 10' is carried on a mounting 36' which is fixedly mounted on the guide rails 33'. The set of blades 20' is mounted on the mountings 31' and 32' and may reciprocate along the longitudinal axis of the electrical wire 1' with respect to the guide rails 33'. The set of grippers 51 is mounted on the same mountings 31' and 32' in any conventional way while the wire cutter 61 is mounted on the mounting 36' in any suitable manner. The particular means for actuating the gripper 51 and the wire cutter 61 do not form an essential part of the present invention except in the combination. Any conventional means allowing reciprocation of the blades, gripper means and wire cutter may be suitably employed.

Figure 11:
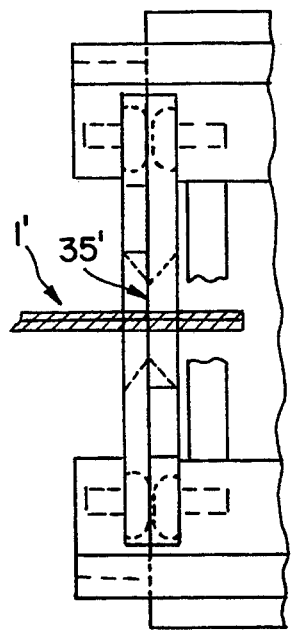
FIG. 11 shows a side view of the home position of the stripping and cutting mechanism including the gripper.
Figure 12:
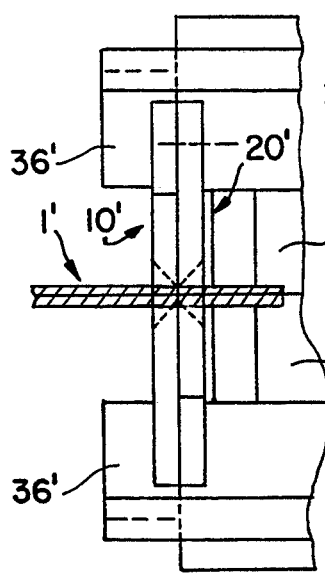
FIG. 12 shows the device illustrated in FIG. 11 but with the gripping device gripping the wire and with the pairs of blades reciprocated together to cut the insulation from the wire.

With the particular details of the embodiment of FIGS. 9-14 having been described in detail, the inventive method will now be described. As should now be understood, the wire 1' is inserted in the diamond-shaped opening 35' formed by the cooperation of the blades 11', 13', 21' and 23' as shown in FIG. 11. The upper gripper 53 and lower gripper 57 are reciprocated toward one another as shown in FIGS. 9 and 12 to securely grip the downstream end of the wire 1' including, as best seen in FIG. 9, extending through the insulative covering 5' and actually gripping the electrical conductor 3'. Concurrently, the blades 11', 13' and 21', 23', respectively, are reciprocated toward one another to the position also shown in FIG. 12 whereby a circumferential cut is made through the insulative covering 5' down to the electrical conductor 3'.

With this position of the blades being held, with reference to FIG. 13, the mounts 31 and 32 are reciprocated with respect to the mounts 36 in the direction of the longitudinal axis of the wire 1'. The edges of the beveled faces 19', 9' of the respective blades 11', 13' hold the cut end of the insulative covering 5' thereby pulling this covering back from the electrical conductor 3' and exposing an additional length of the electrical conductor 3' as shown in FIG. 13. The fact that the gripping means 51 grips both the insulative covering 5' and the electrical conductor 3' makes this scenario possible.

Thereafter, using the downstream edges of the blades 11' and 13' as a guide, the wire cutter 61 is reciprocated as particularly shown in FIGS. 10 and 14 to cut the conductor 3' at the location of the downstream edges of the blades 11', 13'. Thereafter, the gripper 51 is released which allows scrap to be removed from the stripper and the insulative covering 5' to spring back thereby recessing the cut end of the electrical conductor 3' deep within the remaining insulative covering. This scenario is best seen in the left-hand side of FIG. 10 whereby a gap 70 is formed within the insulative covering 5'. In this way, the end of the electrical conductor 3' designated by the reference numeral 71 is suitably protected from exposure.

Figure 15:
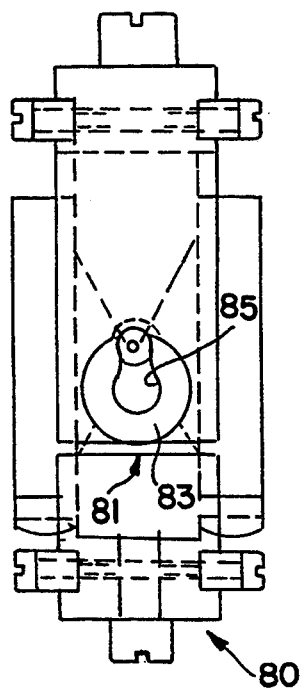
FIGS. 15 and 16 show front and side views, respectively, of the inventive device including a funnel-like wire guiding mechanism and showing, schematically, blade operating structure.
Figure 16:
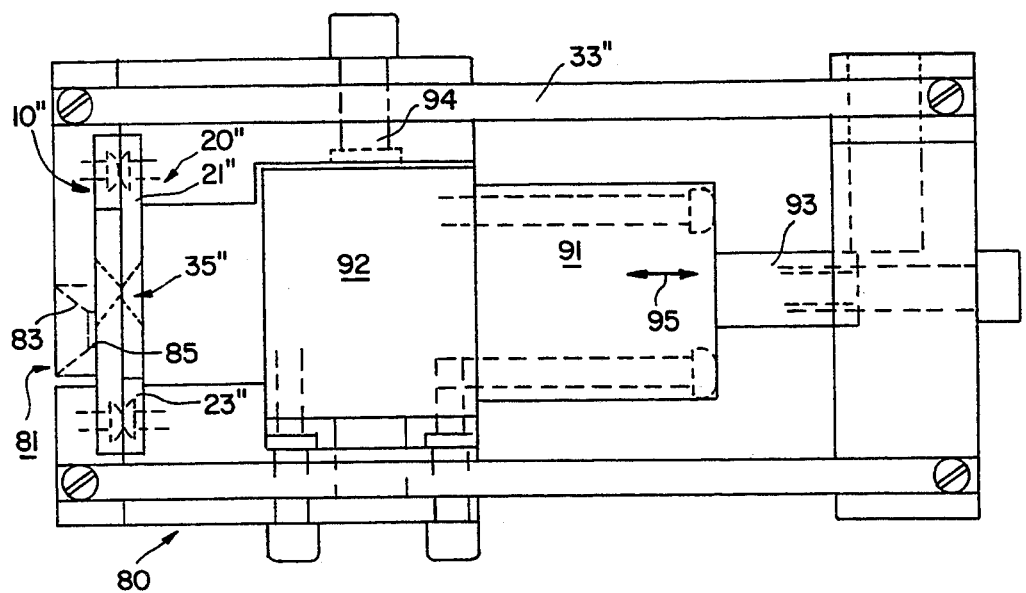
Figure 17:
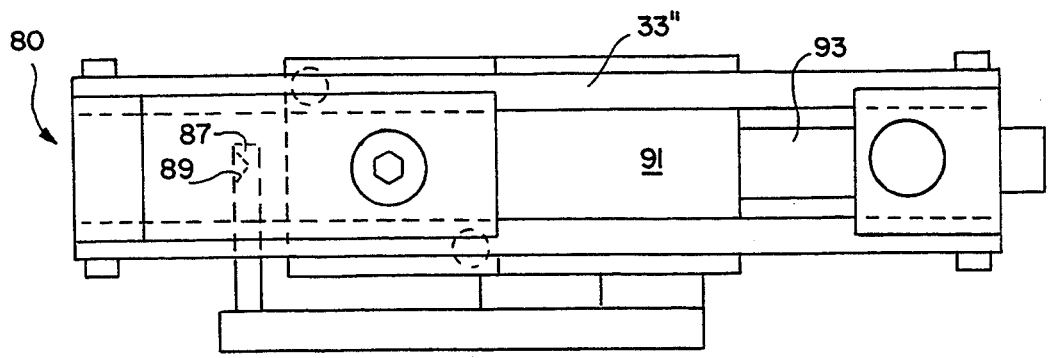
FIG. 17 shows a top view of the view of FIG. 16 also showing a limit stop for the wire.

With reference, now, to FIGS. 15, 16 and 17, several additional features which may be utilized in both embodiments of the present invention are shown. In FIGS. 15-17, like elements will be referred to using like double primed reference numerals.

With reference to FIGS. 15 and 16, in particular, it is seen that the device 80 includes a set of blades 10" and a set of blades 20" identical to the sets of blades 10 and 20, and 10' and 20' described above. As such, for purposes of clarity, the other corresponding reference numerals will not be provided in FIGS. 15-17. Upstream of the set of blades 10" with respect to the direction of insertion of an electrical conductor therethrough, a funnel-like guide mechanism 81 is provided which includes a frustoconical converging wall 83 terminating at an opening 85 through which an electrical wire may be passed and thence through the diamond-shaped opening 35" formed between the sets of blades 10" and 20".

With particular reference to FIG. 17, a stop mechanism 87 is seen to include a cup-shaped recess 89 designed to hold the end of an electrical conductor (not shown) inserted through the diamond-shaped opening 35" to limit the degree of insertion thereof. The longitudinal position of the limit stop 87 may be suitably adjusted in a manner well known to those skilled in the art.

Various hydraulic or pneumatic ram mechanisms are shown schematically in FIGS. 15-17. For example, the cylinder 91 with the associated piston rod 93 are shown. These may be suitably employed to allow reciprocations of the set of blades 10" in the directions illustrated by the double arrow 95. Similarly, the cylinder 92 and piston rod 94 may be suitably coupled to the blades 11" and 13", 21" and 23" to permit them to move toward and away from one another as described herein. Any other suitable actuators for the blades as well as for the gripper means and wire cutter illustrated with reference to FIGS. 9-14 may suitably be employed.

In practicing the methods of the present invention, blades made of any suitable material may be employed. Due to the enhanced design of the present invention as compared to the prior art, the blades may even be made of plastic rather than metal although metal blades may also suitably be employed. The gripper mechanism 51 including the upper gripper 53 and lower gripper 57 may be made of metal, although plastic may also be employed. The particular structures carrying the blades and the grippers are preferably made of a strong metal material to preclude misalignments between the sets of blades as well as between the blades in each set of blades.

As such, an invention has been disclosed in terms of preferred embodiments of apparatus and methods of operation of the apparatuses which fulfill each and every one of the objects of the present invention as set forth hereinabove and provide new and useful improved methods of stripping insulation from wires of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A method of stripping insulation from a wire, including the steps of:
   a) providing a wire stripping device including:
      i) a first set of blades including an upper Delta-blade and a lower V-shaped blade;
      ii) a second set of blades including an upper V-shaped blade and a lower Delta-blade;
      iii) first motive means for moving blades in one of said first or second set of blades toward and away from one another;
      iv) second motive means for moving blades in the other of said first or second set of blades toward and away from one another as well as toward and away from said one of said first or second set of blades;
   b) moving blades in said first and second sets of blades away from one another to form an opening therebetween;
   c) inserting a wire including an inner conductor and an outer insulative layer between respective blades of said first and second sets of blades;
   d) with said first and second sets of blades adjacent one another, moving respective blades of said first and second sets of blades toward one another until said outer insulative layer is cut;
   e) operating said second motive means to move said other of said first or second set of blades away from said one of said first or second set of blades to thereby strip said insulative layer from said inner conductor.

2. The method of claim 1, wherein blades in each set of blades move with respect to one another in a common plane.

3. The method of claim 1, wherein said one of said first or second set of blades comprises said first set of blades.

4. The method of claim 1, wherein said one of said first or second set of blades comprises said second set of blades.

5. The method of claim 1, wherein blades of said first and second set of blades have beveled cutting edges.

6. The method of claim 5, wherein beveled cutting edges of said first set of blades are oriented with respect to beveled cutting edges of said second set of blades such that said opening is diamond-shaped.

7. The method of claim 1, wherein said wire stripping device further includes a gripper mechanism for gripping said wire.

8. The method of claim 7, wherein said wire stripping device further includes a wire cutter.

9. The method of claim 8, wherein said gripper mechanism is carried by said second motive means.

10. The method of claim 9, wherein said wire cutter is carried by said first motive means.

11. The method of claim 10, further including the steps of:
   a) before said step of operating said second motive means, gripping said wire with said gripper mechanism;
   b) after said step of operating said second motive means, cutting said inner conductor with said wire cutter.

12. The method of claim 11, further including the step of concurrently with said operating step, maintaining said first motive means in a position causing said one of said first or second set of blades to grip said inner conductor after cutting said outer insulative layer.

* * * * *